United States Patent Office 2,798,860
Patented July 9, 1957

2,798,860

CONTROLLING THE VULCANIZATION OF RUBBER WITH N,N ARYLENE NITROSO COMPOUNDS

James F. Hand and Andrew Tomlin, Hudson, Ohio, assignors to Monsanto Chemical Company, St. Louis, Mo., a corporation of Delaware No Drawing. Application July 27, 1954,
Serial No. 446,179

15 Claims. (Cl. 260—41.5)

The present invention relates to an improved method of vulcanizing sulfur vulcanizable rubbers and to vulcanized products of enhanced resistance to degradation. More particularly this invention relates to an improved method of controlling the vulcanization of rubber which inherently results in vulcanizates exhibiting marked resistance to degradation.

The problem of avoiding prevulcanization has been intensified through the increasing use of furnace type carbon blacks. These blacks do not possess the inherent retarding properties of the channel blacks but have a significant economic advantage. Moreover, the desire for higher processing speeds or shorter production cycles intensifies the problem of prevulcanization because the more rapid the mixing the higher the temperature.

Partial solutions of the problem have been achieved by using delayed action type accelerators of which the thiazole sulfenamides are an outstanding example or by the use of acidic materials to retard vulcanization. It has also been proposed to use as the sulfur vulcanizing agent an organic sulfur compound which does not liberate sulfur until near curing temperatures. None of these expedients has proved to be entirely satisfactory. It is common for the effect of one to overshadow another. For instance the delayed action accelerators are not necessarily further retarded by use in combination with acidic materials.

Another aspect of the problem is the requirement of vulcanizates possessing good resistance to degradation. It is now well recognized that the influences causing degradation are not confined to oxygen but ozone plays an important role and that the effects are not necessarily mitigated against by conventional antioxidants. Moreover, it was found that organic sulfur vulcanizing agents were deficient in resistance to flex cracking.

In accordance with the present invention a method of compounding has been discovered whereby remarkable resistance to prevulcanization is achieved coupled with the production of vulcanizates which are resistant to attack by ozone. The accelerating component is a delayed action sulfenamide accelerator which is used in conjunction with a compound which has the property of controlling vulcanization during processing and imparting resistance to ozone degradation to the vulcanizates. The latter is a compound of the structure

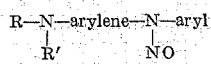

where R is an aryl, alicyclic or alkyl radical and R' is selected from a group consisting of nitroso and hydrogen radicals. These compounds exert a powerful retarding action on sulfenamide accelerators but are not outstanding with other types. Typical examples of these compounds are N,N'-dinitroso-N,N'-diphenyl-p-phenylenediamine, N,N' - dinitroso - N - phenyl - N' - cyclohexyl-p-phenylenediamine, N,N' - dinitroso-N-phenyl-N'-hexyl-p-phenylenediamine, N,N' - dinitroso - N-phenyl-N'-octyl-p-phenylenediamine, N,N' - dinitroso-N-phenyl-N'-decyl-p-phenylenediamine, N-nitroso-N,N'-diphenyl-p-phenylenediamine and N-nitroso-N-phenyl-N'-cyclohexyl-p-phenylenediamine. The compounds in which R is alkyl or alicyclic possess the important advantage of high solubility in rubber. No crystallization on the surface (bloom) has been observed over the range of concentrations investigated although where R is aryl 0.5 part on the rubber will bloom.

These compounds may be prepared by dissolving or suspending the amine in an organic solvent, adding hydrochloric acid slightly in excess of that theoretically required to form the hydrochloride of the amine and then gradually adding substantially the theoretical quantity of sodium nitrite. During the reaction it is desirable to keep the temperature of the reaction mixture below about 20° C. N - phenyl - N' - cyclohexyl-p-phenylenediamine, 173 grams, was suspended in 1600 ml. of butanol and cooled to about −5° C. Substantially 156 ml. of concentrated hydrochloric acid was added and then 104 grams of sodium nitrite dissolved in 160 ml. of water was added gradually over a period of about 2 hours. The temperature of the reaction mixture was kept at 0° C. to −5° C. throughout. The thick reaction mixture was stirred for about an hour after the addition of the nitrite and then neutralized with 50 grams of sodium carbonate dissolved in 200 grams of water. The solid product was filtered from solution, washed with water and recrystallized from alcohol. N,N' - dinitroso - N - phenyl - N' - cyclohexyl-p-phenylenediamine was obtained as small glistening silvery crystals, M. P. 114–116° C.

N,N'-dinitroso-N,N'-diphenyl-p-phenylenediamine was prepared by adding 39.8 grams of sodium nitrite in 75 ml. of water to 75 grams of N,N'-diphenyl-p-phenylenediamine dissolved in glacial acetic acid. The temperature of the reaction mixture was maintained at 15–20° C. The product was isolated as yellow gold crystals. The compound has a melting point of 120° C. although the technical product usually softens at about 115° C. Still further examples of nitrosamines having similar properties for rubber compounding obtainable as described above are N,N'-dinitroso-β-naphthyl-N'-cyclohexyl-p-phenylenediamine, N,N' - dinitroso - N - p-methoxyphenyl-N'-cyclohexyl-p-phenylenediamine and N,N'-dinitroso-N-p-tolyl-N'-cyclohexyl-p-phenylenediamine.

As examples of the invention rubber stocks were compounded comprising:

| Stock | A | B | C |
|---|---|---|---|
| Smoked sheets_____parts by weight__ | 100 | 100 | 100 |
| Furnance carbon black (Philblack O)___do____ | 50 | 50 | 50 |
| Zinc oxide_____do____ | 5 | 5 | 5 |
| Stearic acid_____do____ | 2 | 2 | 2 |
| Saturated hydrocarbon softener_____do____ | 3 | 3 | 3 |
| N-Cyclohexyl 2-benzothiazole sulfenamide parts by weight__ | 0.5 | 0.5 | 0.5 |
| Sulfur_____do____ | 2.5 | 2.5 | 2.5 |
| N-Cyclohexyl-N'-phenyl-N, N'-dinitroso-p-phenylenediamine_____parts by weight__ | | 1.0 | |
| N, N'-Dinitroso-N, N'diphenyl-p-phenylenediamine_____parts by weight__ | | | 1.0 |

The resistance of the stocks to prevulcanization (scorch) was evaluated by means of an NBS model Mooney viscometer at 121° C. following A. S. T. M. D1077-49T with the exception that the scorch point was taken at 10 units higher than the minimum instead of 5 units. Also shown in the table below are the modulus and tensile properties of the optimum (30 minute) cures of the vulcanizates obtained by heating in the usual manner in a press at 144° C.

Table I

| Stock | Mooney Scorch in minutes at 121° C. | Modulus of Elasticity in lbs./in.² at Elongation of 300 Percent | Tensile at Break in lbs./in.² | Ult. Elong., Percent |
|---|---|---|---|---|
| A | 17 | 2,610 | 3,935 | 450 |
| B | 21 | 2,586 | 3,966 | 466 |
| C | 23 | 2,270 | 3,770 | 460 |

It will be noted from the foregoing results that as compared to the control stock A the resistance to prevulcanization has been enhanced without interfering with the modulus and tensile properties of the vulcanizates.

The vulcanized compositions were evaluated for resistance to ozone degradation. Since evaluation under static conditions is not indicative of the service obtained with many types of rubber articles which must withstand flexing, the vulcanized compositions were evaluated under dynamic conditions in an atmosphere containing a definite concentration of ozone. The test is carried out in the following manner: Samples of the stocks are cured in the form of a belt ½" wide, ¼" thick and 5-5/16" diameter and mounted on 1" diameter shafts. The ozone concentration is maintained at 20–30 parts per hundred million throughout the test and the shafts are rotated at 75 R. P. M. In this manner a momentary elongation through a range of 0–20% is provided at any portion of the test specimen passing over the shaft. (The apparatus and procedure employed is described in a paper of Creed et al. entitled "An Apparatus for the Evaluation of Ozone Protective Agents for Elastomers under Dynamic Conditions" given at the Cincinnati, Ohio Meeting of the Rubber Division of the American Chemical Society May 1, 1952). The experimental test specimens are compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

Table II

| Stock | Surface Cracking After Flexing in Ozone for— | | | |
|---|---|---|---|---|
| | 8 Hrs. | 24 Hrs. | 32 Hrs. | 72 Hrs. |
| A | v. slight | slight | moderate | severe. |
| B | none | none | v. slight | moderate. |
| C | none | v. slight | slight | moderate. |

As expected, the vulcanizates were resistant to oxygen degradation. Set forth below are the percentages of the original tensile retained after aging in a circulating air oven for 3 hours at 100° C. The flexing resistance was determined by elongating samples of the vulcanizates 75% of their original length at 430 cycles per minute and determining the flexings before failure. The cut growth was evaluated by inserting a 0.12" cut in India flexing specimens and determining the kilocycles to failure:

Table III

| Stock | Tensile Retained, Percent | Extension Flexing thousands | | Cut Growth (Kilocycles to Failure) |
|---|---|---|---|---|
| | | Unaged | Aged | |
| A | 35 | 94 | 33 | 650 |
| B | 65 | 347 | 207 | 1,000 |
| C | 65 | 330 | 186 | 1,000 |

As further examples of the invention stocks were compounded comprising:

| Stock | D | E | F |
|---|---|---|---|
| Smoked sheets parts by weight | 100 | 100 | 100 |
| Furnace carbon black (Vulcan-3) do | 50 | 50 | 50 |
| Zinc oxide do | 5 | 5 | 5 |
| Stearic acid do | 2 | 2 | 2 |
| Saturated hydrocarbon softener do | 3 | 3 | 3 |
| N-Cyclohexyl 2-benzothiazole sulfenamide parts by weight | 0.5 | 0.5 | 0.5 |
| Sulfur do | 2.5 | | 0.8 |
| N,N'-Dithiobismorpholine do | | 3.5 | 1.5 |
| N,N'-Dinitroso-N,N'-diphenyl-p-phenylenediamine parts by weight | | | 1.0 |

The processing safety and cut growth of these compositions were evaluated as described. The results are set forth below:

Table IV

| Stock | Scorch, Time in Minutes | Cut Growth (Kilocycles to Failure) |
|---|---|---|
| D | 27 | 325 |
| E | 73 | 100 |
| F | 54 | 575 |

These data illustrate the poor resistance to cut growth of vulcanizates where the sulfur vulcanizing agent is a thioamine and show that the incorporation of the nitroso compound overcomes this difficulty and at the same time provides twice the processing safety of the elemental sulfur control stock. Excellent physical properties are obtained by using combinations of elemental sulfur and thioamine, as for example 0.8 part elemental sulfur and 1.5 parts N,N'-dithiobismorpholine.

Typical examples of thioamines suitable for use in the invention comprise N,N'-dithio-bis-dimethylamine, N,N'-dithio-bis-diethylamine, N,N'-dithio-bis-dipropylamine, N,N'-dithio-bis-diisopropylamine, N,N'-dithio-bis-dibutylamine, N,N'-dithio-bis-diisobutylamine, N,N'-dithio-bis-diamylamine, N,N'-dithio-bis-dihexylamine, N,N'-dithio-bis-diheptylamine, and N,N'-dithio-bis-dioctylamine. Even higher groups such as nonyl, decyl, undecyl and dodecyl may be present but the molecular weight becomes so high that the limits of practical dosage are exceeded. Still further examples are N,N'-dithio-bis-dicyclohexylamine, N,N'-dithio-bis-ditetrahydrofurylamine, N,N'-dithio-bis-ditetrahydrothienylamine, N,N'-dithio-bis-β-cyanoethylamine, N,N'-dithio-bis-di-β-chlorethylamine, N,N'-dithio-bis-di-β-phenethylamine, N,N'-dithio-bis-dibenzylamine, N,N'-dithio-bis-ditetrahydrofurylamine, N,N'-dithio-bis-ditetrahydrothienylamine, N,N'-dithio-bis-N-methylcyclohexylamine, N,N'-dithio-bis-N-ethylcyclohexylamine, N,N'-dithio-bis-N-isopropylcyclohexylamine, N,N'-dithio-bis-methylaminoacetonitrile, N,N'-dithio-bis-ethylaminoacetonitrile, N,N'-dithio-bis-propylaminoacetonitrile, N,N'-dithio-bis-butylaminoacetonitrile, N,N'-dithio-bis-methylaminopropionitrile, N,N'-dithio-bis-ethylaminopropionitrile, N,N'-dithio-bis-isopropylaminopropionitrile, N,N'-dithio-bis-butylaminopropionitrile, N,N'-dithio-bis-amylaminopropionitrile, N,N'-dithio-bis-octylaminopropionitrile, N,N'-dithio-bis-octadecylaminopropionitrile, N,N'-dithio-bis-N-methyltetrahydrofurfurylamine, N,N'-dithio-bis-N-ethyltetrahydrofurfurylamine, N,N'-dithio-bis-isopropyltetrahydrofurfurylamine, N,N'-dithio-bis-N-isobutyltetrahydrofurfurylamine, N,N'-dithio-bis-N-cyclohexyltetrahydrofurfurylamine, N,N'-dithio-bis-N-cyclohexytetrahydrothienylamine, N,N'-dithio-bis-cyclohexylaminoacetonitrile, N,N'-dithio-bis-cyclohexylaminopropionitrile, N,N'-dithio-bis-tetrahydrofurylaminopropionitrile, N,N'-dithio-bis-piperidine, N,N'-dithio-bis-α-pipecoline and N,N'-dithio-bis-morpholine.

The N,N'-monothioamines, as for example N,N'-thio-bis-morpholine, N,N'-thio-bis-dimethylamine, N,N'-thio-bis-diethylamine, N,N'-thio-bis-dipropylamine, N,N'-thiobis-diisopropylamine, are vulcanizing agents but less efficient vulcanizing agents. The N,N'-trithio and tetrathio-amines are very efficient vulcanizing agents and their activity can be controlled by use in conjunction with a nitrosoamine as herein defined.

As still further examples of the invention stocks were compounded comprising:

| Stock | G | H | J |
|---|---|---|---|
| Smoked sheets_____parts by weight__ | 100 | 100 | 100 |
| Furnace carbon black (Philblack O)___do____ | 50 | 50 | 50 |
| Zinc oxide_____do____ | 5 | 5 | 5 |
| Stearic acid_____do____ | 3 | 3 | 3 |
| Saturated hydrocarbon softener_____do____ | 3 | 3 | 3 |
| Sulfur_____do____ | 2.5 | 2.5 | 2.5 |
| N-Cyclohexyl-2-benzothiazole sulfenamide parts by weight__ | 0.5 | | |
| 4-(2-Benzothiazolylsulfenyl) morpholine parts by weight__ | | 0.5 | |
| N-tert-Butyl-2-benzothiazole sulfenamide parts by weight__ | | | 0.5 |
| N-N'-Dinitroso-N, N'-diphenyl-p-phenylene-diamine_____parts by weight__ | 1.5 | 1.5 | 1.5 |

The processing safety of these compositions was evaluated as herein described, by means of a Mooney viscometer at 121° C. The results are set forth below:

Table V

| Stock | Scorch, Time in Minutes |
|---|---|
| G | 42 |
| H | 48 |
| J | 56 |

The amounts of the nitroso compounds will vary depending upon the particular stock and results desired. Significant effects are obtained both in vulcanization control and ozone resistance of the vulcanizates with 0.25 part and both effects are further markedly enhanced by increasing amounts at least up to 1.5 parts on the rubber. For a high measure of protection under severe conditions, as for example ordnance tires, 5 parts on the rubber may be indicated.

Of course other delayed action thiazole sulfenamide accelerators may be usd than those chosen to illustrate the invention. Other examples are N-tert-octyl-2-benzothiazole sulfenamide, N,N-diethyl - 2 -benzothiazole sulfenamide, N-isopropyl 2-benzothiazole sulfenamide, N,N-diisopropyl-2-benzothiazole sulfenamide, 1-(2-benzothiazolyl sulfenyl)piperidine, N-β-phenethyl 2-benzothiazole sulfenamide described in copending application of Robert H. Cooper et al., Serial No. 301,968, filed July 31, 1952, now Patent No. 2,695,904, and N,N-dimethyl 2-benzothiazole sulfenamide. Other examples are described in copending application of John J. D'Amico, Serial No. 380,874, filed September 17, 1953.

The improved vulcanizing system is advantageous for use with any sulfur vulcanizable polymeric unsaturated rubbery materials. Examples are the varieties of natural crude rubber, a polymer considered to contain multiple isoprene units, synthetic diene polymers, as for example homopolymers of butadiene, isoprene, 2,3-dimethylbutadiene and copolymers of these monomers with styrene, acrylonitrile and isobutylene.

It is intended to cover all changes and modifications of the examples of the invention herein chosen for purposes of disclosure which do not constitute departures from the spirit and scope of the invention.

What is claimed is:

1. A method of vulcanizing a sulfur vulcanizable diene hydrocarbon rubber which comprises heating the rubber with a sulfur vulcanizing agent in the presence of a delayed action thiazole sulfenamide accelerator and a compound of the structure

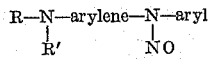

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to cracking by ozone.

2. A method of vulcanizing a sulfur vulcanizable diene hydrocarbon rubber which comprises heating the rubber with a sulfur vulcanizing agent in the presence of a delayed action thiazole sulfenamide accelerator and a compound of the structure

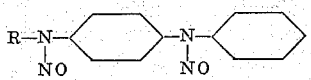

where R represents an aliphatic hydrocarbon group the amount of the nitrosoamine being sufficient both to retard scorch during processing and to increase the resistance of the vulcanizate to cracking by ozone.

3. A method of vulcanizing a sulfur vulcanizable rubber diene hydrocarbon which comprises heating the rubber with a sulfur vulcanizing agent in the presence of a delayed action thiazole sulfenamide accelerator and a compound of the structure

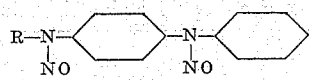

where R represents an alkyl group of six to twelve carbon atoms the amount of the nitrosoamine being sufficient both to retard scorch during processing and to increase the resistance of the vulcanizate to cracking by ozone.

4. A method of vulcanizing a sulfur vulcanizable diene hydrocarbon rubber which comprises heating the rubber with a sulfur vulcanizing agent in the presence of N-cyclohexyl 2-benzothiazole sulfenamide and a compound of the structure

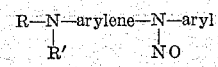

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to cracking by ozone.

5. A method of vulcanizing a sulfur vulcanizable diene hydrocarbon rubber which comprises heating the rubber with a sulfur vulcanizing agent in the presence of 4-(2-benzothiazolylsulfenyl)morpholine and a compound of the structure

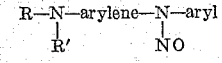

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to cracking by ozone.

6. A method of vulcanizing a sulfur vulcanizable diene hydrocarbon rubber which comprises heating the rubber with a sulfur vulcanizing agent in the presence of N-tert-butyl-2-benzothiazole sulfenamide and a compound of the structure

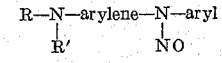

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to cracking by ozone.

7. A method of vulcanizing a sulfur vulcanizable diene hydrocarbon rubber which comprises heating the rubber with a sulfur vulcanizing agent in the presence of a delayed action thiazole sulfenamide accelerator and a compound of the structure

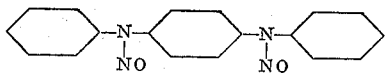

the amount of the nitrosoamine being sufficient both to retard scorch during processing and to increase the resistance of the vulcanizate to cracking by ozone.

8. A method of vulcanizing a sulfur vulcanizable diene hydrocarbon rubber which comprises heating the rubber with a sulfur vulcanizing agent in the presence of a delayed action thiazole sulfenamide accelerator and a compound of the structure

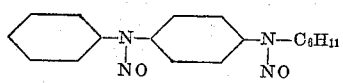

the amount of the nitrosoamine being sufficient both to retard scorch during processing and to increase the resistance of the vulcanizate to cracking by ozone.

9. A method of vulcanizing a sulfur vulcanizable diene hydrocarbon rubber which comprises heating the rubber and a furnace carbon black with a sulfur vulcanizing agent in the presence of a delayed action thiazole sulfenamide accelerator and a compound of the structure

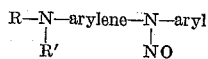

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to the cracking by ozone.

10. A method of vulcanizing a sulfur vulcanizable diene hydrocarbon rubber which compries heating the rubber with an N,N'-dithio secondary amine vulcanizing agent in the presence of a delayed action thiazole sulfenamide accelerator and a compound of the structure

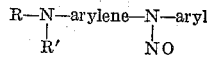

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to cracking by ozone.

11. A vulcanized rubber product resistant to degradation by ozone obtained by heating a sulfur vulcanizable diene hydrocarbon rubber with a sulfur vulcanizing agent in the presence of a delayed action thiazole sulfenamide accelerator and a compound of the structure

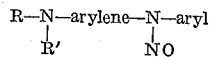

where R is selected from a group consisting of aryl, alicyclic and alkyl radicals and R' is selected from a group consisting of nitroso and hydrogen groups the amount of the nitrosoamine being sufficient both to retard scorch during processing and to increase the resistance of the vulcanizate to cracking by ozone.

12. A sulfur vulcanizable diene hydrocarbon rubber having incorporated therein a sulfur vulcanizing agent, a delayed action thiazole sulfenamide accelerator and a compound of the structure

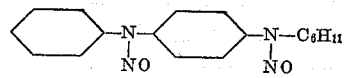

the amount of nitrosoamine being sufficient both to retard scorch during processing and to increase the resistance of the vulcanizate to cracking by ozone.

13. A sulfur vulcanizable diene hydrocarbon rubber having incorporated therein a furnace carbon black with a sulfur vulcanizing agent a delayed action thiazole sulfenamide accelerator and a compound of the structure

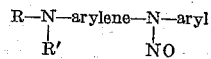

where R is selected from a group consisting of aryl, alicyclic and alkyl radicals and R' is selected from a group consisting of nitroso and hydrogen groups the amount of nitrosoamine being sufficient both to retard scorch during processing and to increase the resistance of the vulcanizate to cracking by ozone.

14. A sulfur vulcanizable diene hydrocarbon rubber having incorporated therein an N,N'-dithio secondary amine vulcanizing agent a delayed action thiazole sulfenamide accelerator and a compound of the structure

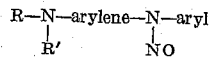

where R is selected from a group consisting of aryl, alicyclic and alkyl radicals and R' is selected from a group consisting of nitroso and hydrogen groups the amount of nitrosoamine being sufficient both to retard scorch during processing and to increase the resistance of the vulcanizate to cracking by ozone.

15. A sulfur vulcanizable diene hydrocarbon rubber having incorporated therein N,N'-dithiobismorpholine a compound of the structure

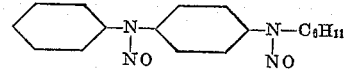

the amount of nitrosoamine being sufficient both to retard scorch during processing and to increase the resistance of the vulcanizate to cracking by ozone.

No references cited.